United States Patent Office 3,480,657
Patented Nov. 25, 1969

3,480,657
1,3-DICYANO-4,7-METHANO-3a,4,7,7a-TETRA-
HYDROINDANE COMPOUNDS
Sidney B. Richter, Chicago, and Alfred A. Levin, Skokie,
Ill., assignors to Velsicol Chemical Corporation, Chicago, Ill., a corporation of Illinois
No Drawing. Filed June 14, 1967, Ser. No. 645,874
Int. Cl. C07c 121/46, 121/48
U.S. Cl. 260—464          6 Claims

ABSTRACT OF THE DISCLOSURE

Compounds of the formula

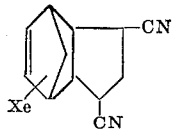

wherein each X is independently selected from the group consisting of hydrogen, halogen and alkyl; provided a minimum of 4X are halogen. An insecticidal composition comprising an inert carrier and, in a quantity toxic to insects, a compound heretofore described. A method of destroying insects which comprises applying to the locus of the insects, an insecticidal composition comprising an inert carrier and, as an essential active ingredient a compound as described above.

---

This invention relates to new compositions of matter. In particular this invention relates to new pesticidally active compounds of the formula

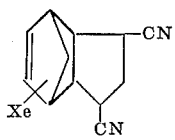

wherein each X is independently selected from the group consisting of hydrogen, halogen, and alkyl; provided a minimum of 4X are halogen.

In a preferred embodiment of this invention each X is independently selected from the group consisting of hydrogen, chlorine, bromine and lower alkyl; and a minimum of 4X are selected from the group consisting of chlorine and bromine. It can be preferred that the 6X atoms be identical. It can also be preferred that a maximum of one X is alkyl having up to 4 carbon atoms.

The compounds of the present invention are unexpectedly effective as pesticides and particularly as insecticides.

Exemplary of the compounds of the present invention are:

1,3-dicyano-4,5,6,7,8,8-hexachloro-4,7-methano-3a,4,7,7a-tetrahydroindane,
1,3-dicyano-4,5,6,7,8,8-hexabromo-4,7-methano-3a,4,7,7a-tetrahydroindane,
1,3-dicyano-4,5,6,7,8,8-hexafluoro-4,7-methano-3a,4,7,7a-tetrahydroindane,
1,3-dicyano-4,5,6,7,8,-pentachloro-4,7-methano-3a,4,7,7a-tetrahydroindane,
1,3-dicyano-4,5,6,7,8-pentabromo-4,7-methano-3a,4,7,7a-tetrahydroindane,
1,3-dicyano-4,5,6,8,8-pentabromo-4,7-methano-3a,4,7,7a-tetrahydroindane,
1,3-dicyano-4,5,6,7-tetrachloro-4,7-methano-3a,4,7,7a-tetrahydroindane
1,3-dicyano-4,5,6,7-tetrabromo-4,7-methano-3a,4,7,7a-tetrahydroindane,
1,3-dicyano-4,5,6,7-tetrachloro-8,8-dibromo-4,7-methano-3a,4,7,7a-tetrahydroindane,
1,3-dicyano-4,5,6,7-tetrachloro-8,8-difluoro-4,7-methano-3a,4,7,7a-tetrahydroindane,
1,3-dicyano-4,5,6,7,8-pentachloro-8-methyl-4,7-methano-3a,4,7,7a-tetrahydroindane,
1,3-dicyano-4,5,6,7,8-pentachloro-8-ethyl-4,7-methano-3a,4,7,7a-tetrahydroindane,
1,3-dicyano-4,5,6,7,8-pentachloro-8-isopropyl-4,7-methano-3a,4,7,7a-tetrahydroindane,
1,3-dicyano-4,5,6,7,8-pentachloro-8-n-butyl-4,7-methano-3a,4,7,7a-tetrahydroindane,
1,3-dicyano-4,5,6,7,8-pentachloro-8-isobutyl-4,7-methano-3a,4,7,7a-tetrahydroindane,
1,3-dicyano-4,5,6,7,8-pentabromo-8-methyl-4,7-methano-3a,4,7,7a-tetrahydroindane,
1,3-dicyano-4,5,6,7,8-pentabromo-8-ethyl-4,7-methano-3a,4,7,7a-tetrahydroindane, and the like.

These compounds can be prepared readily by dehydration of a 4,7-methano - 3a,4,7,7a - tetrahydroindane-1,3-dicarboxamide, having the substituents on its ring in the positions desired in the final product with strong dehydrating agents such as $POCl_3$ and $P_2O_5$.

The 4,7-methano-3a,4,7,7a-tetrahydroindane-1,3-dicarboxamide can be prepared from the 4,7-methano-3a,4,7,7a-tetrahydroindane-1,3-dicarbonyl chloride having the desired substituents on the ring, by treating it with ammonium hydroxide. The 4,7-methano-3a,4,7,7a-tetrahydroindane-1,3-dicarbonyl chloride can be prepared by reacting the corresponding 1,3-dicarboxy-4,7-methano-3a,4,7,7a-tetrahydroindane with a chlorinating agent such as $SOCl_2$. The 1,3-dicarboxy-4,7-methano-3a,4,7,7a-tetrahydroindane can be prepared from the 1,4,4a,5,8,8a-hexahydro-1,4,5,8-dimethanonaphthalene by refluxing said naphthalene in the presence of nitric acid. The dimethanonaphthalene can readily be prepared by the well known Diels-Alder reaction of a substituted cyclo pentadiene with bicyclo[2.2.1]-heptadiene-2,5. The substituents on the cyclopentadiene remain uneffected during the foregoing reactions. Thus, the X substituents, as heretofore described, in the compounds of this invention, are obtained by selecting a substituted cyclopentadiene wherein the substituents are those desired in the final product.

Appropriate cyclopentadienes for starting materials to prepare the compounds of this invention are 1,2,3,4,5,5-hexachlorocyclopentadiene,
1,2,3,4,5,5-hexabromocyclopentadiene,
1,2,3,4,5,5-hexafluorocyclopentadiene,
1,2,3,4,5-pentachlorocyclopentadiene,
1,2,3,4,5-pentabromocyclopentadiene,
1,2,3,5,5-pentabromocyclopentadiene,
1,2,3,4-tetrachlorocyclopentadiene,
1,2,3,4-tetrabromocyclopentadiene,
1,2,3,4-tetrachloro-5,5-dibromocyclopentadiene,
1,2,3,4-tetrachloro-5,5-difluorocyclopentadiene,
1,2,3,4,5-pentachloro-5-methylcyclopentadiene,
1,2,3,4,5-pentachloro-5-ethylcyclopentadiene,
1,2,3,4,5-pentachloro-5-n-propylcyclopentadiene,
1,2,3,4,5-pentachloro-5-n-butylcyclopentadiene,
1,2,3,4,5-pentachloro-1-t-butylcyclopentadiene,
1,2,3,4,5-pentabromo-5-methylcyclopentadiene,
1,2,3,4,5-pentabromo-5-ethylcyclopentadiene and the like.

The manner in which the compounds of this invention can be prepared readily is illustrated in the following examples.

EXAMPLE 1

Preparation of 1,3-dicarboxy-4,5,6,7,8,8-hexachloro-4,7-methano-3a,4,7,7a-tetrahydroindane 1,2,3,4,10,10-hexachloro - 1,4,4a,5,8,8a - hexahydro- 1,4,5,8-dimethanonaphthalene (60 g.–0.16 mole) and concentrated nitric acid (800 ml.) were charged into a 1 liter glass reaction flask equipped with mechanical stirrer and reflux condenser. The reaction mixture was heated at reflux for a period of about 3 days. After this time, the reaction mixture was cooled and poured onto crushed ice to yield a white solid. The white solid was filtered and dissolved in ether. The ether solution was washed with water, dried over magnesium sulfate, filtered and the ether evaporated under aspirator pressure to yield a gummy solid as the residue. The solid was recrystallized from an acetone-pentane mixture to yield 26 g. of 1,3-dicarboxy-4,5,6,7,8,8-hexachloro - 4,7 - methano-3a,4,7,7a-tetrahydroindane having a melting point of 268 to 270° C.

EXAMPLE 2

Preparation of 4,5,6,7,8,8-hexachloro-4,7-methano-3a,4,7,7a-tetrahydroindane-1,3-dicarbonyl chloride 1,3-dicarboxy-4,5,6,7,8,8-hexachloro - 4,7 - methano-3a,4,7,7a-tetrahydroindane (26 g.; 0.08 mole), prepared above, and thionyl chloride (150 ml.) were charged into a 250 ml. glass reaction flask equipped with mechanical stirrer and reflux condenser. The reaction mixture was heated at reflux overnight. After this time the excess thionyl chloride was distilled off to yield 23 g. of 4,5,6,7,8,8-hexachloro - 4,7 - methano-3a,4,7,7a-tetrahydroindane-1,3-dicarbonyl chloride as a solid having a melting point of 153 to 157° C.

EXAMPLE 3

Preparation of 4,5,6,7,8,8-hexachloro-4,7-methano-3a,4,7,7a-tetrahydroindane-1,3-dicarboxamide A solution of 4,5,6,7,8,8-hexachloro-4,7-methano-3a,4,7,7a-tetrahydroindane-1,3-dicarbonyl chloride (23 g.; 0.049 mole), prepared above, in dioxane (75 ml.) was added with stirring to 1 liter of cold ammonium hydroxide. The mixture was allowed to stand for a period of about 4 hours. After this time the reaction mixture was filtered with suction to yield 13.5 g. of solid product. The product was recrystallized from an acetone-pentane mixture and dried overnight to yield 4,5,6,7,8,8-hexachloro-4,7-methano-3a,4,7,7,7a-tetrahydroindane - 1,3 - dicarboxamide having a melting point of 266 to 268° C.

EXAMPLE 4

Preparation of 1,3-dicyano-4,5,6,7,8,8-hexachloro-4,7-methano-3a,4,7,7a-tetrahydroindane A slurry of 4,5,6,7,8,8-hexachloro-4,7-methano-3a,4,7,7a-tetrahydroindane-1,3-dicarboxamide (9.1 g.; 0.021 mole), prepared above, in pyridine (200 ml.) was charged into a 300 ml. glass reaction flask equipped with mechanical stirrer, reflux condenser, internal thermometer and dropping funnel. The reaction mixture was heated to 65° C. after which time the reaction flask was packed in ice and phosphorous oxychloride (20.2 g.; 0.13 mole) was added over a period of about 30 minutes at such a rate as to maintain the temperature between 65–70° C. After this time, the reaction mixture was heated at 70 to 75° C. for a period of about 4 hours, cooled, and poured onto ice to yield a solid. The solid was isolated by filtration, dissolved in acetone and treated with activated charcoal until the solution had lost most of its color. The solution was evaporated under aspirator pressure to yield a white solid as the residue. The solid was dried overnight to yield 1,3-dicyano-4,5,6,7,8,8-hexachloro - 4,7 - methano-3a,4,7,7a-tetrahydroindane (2.4 grams) having a melting point of 204 to 206° C. having the following elemental analysis:

Analysis for $C_{12}H_6Cl_2N_2$.—Theoretical, percent: C, 36.86; H, 1.56; Cl, 54.41; N, 7.17. Found, percent: C, 36.89; H, 2.66; Cl, 53.36; N, 7.25.

EXAMPLE 5

Preparation of 1,2,3,4,10-pentachloro-10-methyl-1,4,4a,5,8,8a-hexahydro-1,4,5,8-dimethanonaphthalene Bicyclo-[2.2.1]-heptadiene-2,5 (750 g.) and 1,2,3,4,5-pentachloro-5-methylcyclopentadiene (750 g.) are placed into a glass reaction flask equipped with mechanical stirrer and reflux condenser. The reaction mixture is heated at a reflux for a period of about 16 to 18 hours. At this time the excess bicycloheptadiene is removed by distillation and the residue subjected to further distillation under from about 1 mm. to 20 mm. Hg pressure to yield a crude, solid product. The solid is recrystallized to yield 1,2,3,4,10-pentachloro - 10 - methyl-1,4,4a,5,8,8a-hexahydro-1,4,5,8-dimethanonaphthalene having a melting point of 96 to 98° C.

EXAMPLE 6

Preparation of 1,3-dicarboxy - 4,5,6,7,8 - pentachloro-8-methyl-4,7-methano-3a,4,7,7a-tetrahydroindane 1,2,3,4,10 - pentachloro - 10 - methyl-1,4,4a,5,8,8a-hexahydro-1,4,5,8-dimethanonaphthalene (60 g.) and concentrated nitric acid (800 ml.) are charged into a 1 liter glass reaction flask equipped with mechanical stirrer and reflux condenser. The reaction mixture is heated at reflux for a period of about 3 days. After this time, the reaction mixture is cooled and poured onto crushed ice to yield a solid. The solid is filtered out and dissolved in ether. The ether solution is washed with water, dried over magnesium sulfate, filtered and evaporated under aspirator pressure to yield a solid as the residue. The solid is recrystallized to yield 1,3-dicarboxy-4,5,6,7,8-pentachloro - 8 - methyl-4,7-methano-3a,4,7,7a-tetrahydroindane.

EXAMPLE 7

Preparation of 4,5,6,7,8-pentachloro - 8 - methyl-4,7-methano-3a,4,7,7a-tetrahydroindane - 1,3 - dicarbonyl chloride 1,3-dicarboxy-4,5,6,7,8-pentachloro - 8 - methyl-4,7-methano-3a,4,7,7a-tetrahydroindane (26 g.), prepared above, and thionyl chloride (150 ml.) are charged into a 250 ml. glass reaction flask equipped with mechanical stirrer and reflux condenser. The reaction mixture is heated at reflux overnight. After this time the excess thionyl chloride is distilled off to yield 4,5,6,7,8-pentachloro - 8 - methyl-4,7-methano-3a,4,7,7a-tetrahydroindane-1,3-dicarbonyl chloride as the residue.

EXAMPLE 8

Preparation of 4,5,6,7,8-pentachloro - 8 - methyl-4,7-methano-3a,4,7,7a-tetrahydroindane-1,3-dicarboxamide A solution of 4,5,6,7,8-pentachloro - 8 - methyl-4,7-methano-3a,4,7,7a-tetrahydroindane-1,3-dicarbonyl chloride (23 g.) in dioxane (75 ml.) is added with stirring to 1 liter of cold ammonium hydroxide. The mixture is allowed to stand for a period of about 4 hours. After this time the reaction mixture is filtered with suction to yield a solid product. The product is recrystallized to yield 4,5,6,7,8-pentachloro-8-methyl - 4,7 - methano-3a,4,7,7a-tetrahydroindane-1,3-di-carboxamide.

EXAMPLE 9

Preparation of 1,3-dicyano-4,5,6,7,8-pentachloro-8-methyl-4,7-methano-3a,4,7,7a-tetrahydroindane A slurry of 4,5,6,7,8-pentachloro-8-methyl-4,7-methano - 3a,4,7,7a - tetrahydroindane-1,3-dicarboxamide (91 g.), prepared above, in pyridine (200 ml.) is charged into a 300 ml. glass reaction flask equipped with mechanical stirrer, reflux condenser, internal thermometer and dropping funnel. The reaction mixture is heated to about 65° C., after which time the reaction flask is packed in ice and phosphorous oxychloride (20.2 g.) is added over a period of about 30 minutes at such a rate as to maintain the temperature at 65–70° C. After this time the reaction mixture is heated from about 70 to about 75° C. for a period of about 4 hours, cooled and poured onto ice to yield a solid. The solid is isolated by filtration, dissolved in acetone and treated with activated charcoal until the solution has lost most of its color. The solution is then evaporated under aspirator pressure to yield a solid as the residue. The solid is dried in an Abderhalden apparatus to yield 1,3-dicyano-4,5,6,7,8-pentachloro-8-methyl - 4,7 - methano-3a,4,7,7a-tetrahydroindane. Additional compounds of the present invention can be prepared readily in a manner similar to that detailed in the above examples. Presented in the following examples are the essential reactants required to prepare the indicated named compounds according to the methods detailed in the foregoing examples:

EXAMPLE 10

Preparation of 1,3-dicyano-4,5,6,7,8,8-hexabromo-4,7-methano-3a,4,7,7a-tetrahydroindane The compound 1,3-dicyano-4,5,6,7,8,8-hexabromo-4,7-methano-3a,4,7,7a-tetrahydroindane can be prepared by using hexabromocyclopentadiene and bicycloheptadiene as starting materials and following the reaction steps as described in Examples 1 to 9.

EXAMPLE 11

Preparation of 1,3-dicyano-4,5,6,7,8-pentachloro-4,7-methano-3a,4,7,7a-tetrahydroindane The compound 1,3-dicyano-4,5,6,7,8-pentachloro-4,7-methano-3a,4,7,7a-tetrahydroindane can be prepared by using 1,2,3,4,5-pentachlorocyclopentadiene and bicycloheptadiene as starting materials and following the reaction steps as described in Examples 1 to 9.

EXAMPLE 12

Preparation of 1,3-dicyano-4,5,6,7-tetrachloro-4,7-methano-3a,4,7,7a-tetrahydroindane The compound 1,3-dicyano - 4,5,6,7 - tetrachloro-4,7-methano-3a,4,7,7a-tetrahydroindane can be prepared by using 1,2,3,4-tetrachlorocyclopentadiene and bicycloheptadiene as starting materials and following the reaction steps as described in Examples 1 to 9.

EXAMPLE 13

Preparation of 1,3-dicyano-4,5,6,7-tetrachloro-8,8-difluoro-4,7-methano-3a,4,7,7a-tetrahydroindane The compound 1,3-dicyano-4,5,6,7-tetrachloro-8,8-difluoro 4,7-methano-3a,4,7,7a-tetrahydroindane can be prepared by using 1,2,3,4-tetrachloro-5,5-difluorocyclopentadiene and bicycloheptadiene as starting materials and following the reaction steps as described in Examples 1 to 9.

EXAMPLE 14

Preparation of 1,3-dicyano-4,5,6,7,8-pentachloro-8-ethyl-4,7-methano-3a,4,7,7a-tetrahydroindane The compound 1,3-dicyano - 4,5,6,7,8 - pentachloro-8-ethyl-4,7-methano-3a,4,7,7a-tetrahydroindane can be prepared by using 1,2,3,4,5-pentachloro-5-ethylcyclopentadiene and bicycloheptadiene as starting materials and following the reaction steps as described in Examples 1 to 9.

For practical use as insecticides, the compounds of this invention are generally incorporated into insecticidal compositions which comprise an inert carrier and an insecticidally toxic amount of such a compound. Such insecticidal compositions, which can also be called formulations, enable the active compound to be applied conveniently to the site of the insect infestation in any desired quantity. These compositions can be solids, such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like.

Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 15

Preparation of a dust

Product of Example 4 _____ 10
Powdered talc _____ 90

The above ingredients are mixed in a mechanical grinder-blender and are ground until a homogeneous, free-flowing dust of the desired particle size is obtained. This dust is suitable for direct application to the site of the insect infestation.

The compounds of this invention can be applied as insecticides in any manner recognized by the art. One method for destroying insects comprises applying to the locus of the insect infestation, an insecticidal composition comprising an inert carrier and as the essential active ingredient, in a quantity which is toxic to said insects, a compound of the present invention. The concentration of the new compounds of this invention in the isecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides in the insecticidal compositions heretofore described. These other insecticides can comprise from about 5% to about 95% of the active ingredients in the insecticidal compositions. Use of the combinations of these other insecticides with the compounds of the present invention provide insecticidal compositions which are more effective in controlling insects and often provide results unattainable with separate compositions of the individual insecticides. The other insecticides with which the compounds of this invention can be used in the insecticidal compositions to control insects, can include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion, methyl parathion, EPN, demeton, carbonphenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexyphenol, DNB, DNP, binapacril, azobenzene, and the like; organic carbamate compounds such as carbarly, ortho 5353, and the like; organic sulfur compounds such as phenothiazine, phenoxathin, lauryl thiocyanate, [bis-(2-thiocyanoethyl) ether], isobornyl thiocyanoacetate, and the like; as well as such substances usually referred to as fumigants, such as hydrogen cyanide, carbon tetrachloride, calcium cyanide, carbon disulfide, ethylene, dichloride, propylene, dichloride, ethylene dibromide, ethylene oxide, methyl bromide, paradichlorbenzene, and the like.

The compounds of the present invention can also be combined with fungicidal and nematocidal chemical compounds to form pesticidal compositions useful for the control of fungi and in some cases soil nematodes as well as insects. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate and the like; while examples of nematocidal compounds, are chloropicrin, O,O-diethyl O-(2,4-dichlorophenyl) phosphorothioate, tetrachlorothiophene, dazomet, dibromochloropropane, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects such as the Mexican bean beetle, the southern armyworm; the piercing-sucking insects, such as the pea aphid, the cereal leaf beetle, the house fly, the grape leafhopper, the chinch bug, the lygus bugs, oyster shell scale, the California red scale, the Florida red scale, the soft scale and mosquitoes; the internal feeders, including borers such as the European corn borer, the peach twig borer and the corn earworm, worms or weevils such as the codling moth, alfalfa weevil, cotton boll weevil, pink boll worm, plum curculio, red banded leaf roller, melonworm, cabbage looper and apple maggot, leaf miners such as the apple leaf miner, birch leaf miner, and beet leaf miner, and gall insects such as the wheat joint worm and the grape phylloxers. Insects which attach below the surface of the ground are classified as subterranean insects and include such destructive pests as the wooly apple aphid, the Japanese beetle, the onion maggot, and the corn rootworm.

Mites and ticks are not true insects. Many economically important species of mites and ticks can be controlled by the compounds of this present invention such as the red spider mite, the two spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

The utility of the compounds of the present invention as insecticides was illustrated in various experiments recognized by the art. In one series of experiments the test compounds were formulated by dissolving the compounds in acetone and dispersing the acetone solution in distilled water containing small amounts of emulsifier.

In one experiment carried out for the control of insects by feeding, lima bean leaves were sprayed on the top and bottom surfaces with the above formulation and offered to ten larva of the Southern army worm (late third instar stage) for a feeding period of 48 hours. After this period the mortality was observed. The results were as follows:

TABLE I

| Test chemical | Concn, p.p.m, of actual chemical in liquid sprayed | Percent mortality |
|---|---|---|
| 1,3-dicyano-4,5,6,7,8,8-hexachloro-4,7-methano-3a,4,7,7a-tetrahydroindane. | 3,500 | 100 |
| Do | 2,000 | 100 |
| Do | 1,000 | 100 |
| Do | 800 | 90 |
| Do | 400 | 80 |

In another experiment for the control of the Mexican bean beetle, lima bean leaves were dipped into 3000 and 3500 p.p.m. solution of the test chemical in water. The leaves were dried and ten third instar Mexican bean beetle larvae were placed on each leaf. After a period of 48 hours the mortality was observed. The results were as follows:

TABLE II

| Test chemical | Concn. p.p.m. of test chemical | Percent mortality |
|---|---|---|
| 1,3-dicyano-4,5,6,7,8,8-hexachloro-4,7-methano-3a,4,7,7a-tetrahydroindane. | 3,500 | 100 |
| Do | 3,000 | 100 |

In another experiment for the control of the house fly the test chemical was dissolved in acetone and dispersed in water containing small amounts of emulsifiers. Fifty adult flies were placed into each of several cages and sprayed with solutions of the test chemical at various concentrations. Mortality was observed after 24 hours giving the following results:

TABLE III

| Test chemical | Concn. p.p.m. of test chemical in the spray | Percent mortality |
|---|---|---|
| 1,3-dicyano-4,5,6,7,8,8-hexachloro-4,7-methano-3a,4,7,7a-tetrahydroindane. | 1,000 | 100 |
| Do | 400 | 100 |
| Do | 160 | [1] 100 |
| Do | 80 | [1] 100 |
| Do | 40 | [1] 93 |

[1] Average results of six replicate tests.

We claim:
1. The compound of the formula

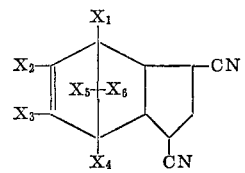

wherein each X is independently selected from the group consisting of hydrogen, fluorine, chlorine, bromine and lower alkyl; provided a minimum of 4 of the X substituents are fluorine, chlorine or bromine and the lower alkyl substituents are in the $X_5$ or $X_6$ positions.

2. The compound 1,3-dicyano-4,5,6,7,8,8-hexachloro-4,7-methano-3a,4,7,7a-tetrahydroindane.

3. The compound 1,3-dicyano-4,5,6,7,8,8-hexabromo-4,7-methano-3a,4,7,7a-tetrahydroindane.

4. The compound 1,3-dicyano-4,5,6,7,8-pentachloro-4,7-methano-3a,4,7,7a-tetrahydroindane.

5. The compound 1,3-dicyano-4,5,6,7-tetrachloro-4,7-methano-3a,4,7,7a-tetrahydroindane.

6. The compound 1,3-dicyano-4,5,6,7,8-pentachloro-8-methyl-4,7-methano-3a,4,7,7a-tetrahydroindane.

References Cited

UNITED STATES PATENTS 2,365,936  12/1944  Bruson _____ 424—304
2,635,979  4/1953  Lidou _____ 260—464 X
2,793,975  5/1957  Mark _____ 260—464 X
3,238,251  3/1966  Williams _____ 260—464 X
3,274,217  9/1966  Dombro _____ 260—464 X

FOREIGN PATENTS 84,715  3/1957  Netherlands.

CHARLES B. PARKER, Primary Examiner
S. T. LAWRENCE III, Assistant Examiner

U.S. Cl. X.R.

71—3; 424—304; 260—514, 544, 557, 648, 653.3, 652

UNITED STATES PATENT OFFICE
CERTIFICATE OF CORRECTION

Patent No. 3,480,657  Dated November 25, 1969

Inventor(s) Sidney B. Richter and Alfred A. Levin

It is certified that error appears in the above-identified patent and that said Letters Patent are hereby corrected as shown below:

Col. 1, in the structure, each occurrence, that portion reading "$X_e$" should read --$X_6$--.

Col. 3, line 73, "$C_{12}H_6ClN_2$" should read --$C_{12}H_6Cl_6N_2$--.

Col. 6, line 45, "isecticidal" should read --insecticidal--.

Col. 7, line 5, "carbarly" should read --carbaryl--;
line 11, "ethylene, dichloride" should read --ethylene dichloride--; line 12, "propylene, dichloride" should read --propylene dichloride--.

SIGNED AND
SEALED

JUL 28 1970

(SEAL)
Attest:

Edward M. Fletcher, Jr.
Attesting Officer

WILLIAM E. SCHUYLER, JR.
Commissioner of Patents